United States Patent
Sato et al.

(10) Patent No.: US 9,393,621 B2
(45) Date of Patent: Jul. 19, 2016

(54) HALF BEARING

(71) Applicant: Senju Metal Industry Co., Ltd., Tokyo (JP)

(72) Inventors: Naoki Sato, Tochigi-ken (JP); Ryoichi Kurata, Tochigi-ken (JP)

(73) Assignee: Senju Metal Industry Co., Ltd., Tokyo (JP)

( * ) Notice: Subject to any disclaimer, the term of this patent is extended or adjusted under 35 U.S.C. 154(b) by 0 days.

(21) Appl. No.: 14/409,388

(22) PCT Filed: Jun. 18, 2013

(86) PCT No.: PCT/JP2013/066720
§ 371 (c)(1),
(2) Date: Dec. 18, 2014

(87) PCT Pub. No.: WO2013/191172
PCT Pub. Date: Dec. 27, 2013

(65) Prior Publication Data
US 2015/0323007 A1    Nov. 12, 2015

(30) Foreign Application Priority Data

Jun. 19, 2012 (JP) .................................. 2012-137800

(51) Int. Cl.
*F16C 11/00* (2006.01)
*F16C 33/10* (2006.01)
(Continued)

(52) U.S. Cl.
CPC ................ *B22F 7/06* (2013.01); *F04B 27/086* (2013.01); *F16C 33/046* (2013.01);
(Continued)

(58) Field of Classification Search
CPC .. F17C 17/022; F17C 33/046; F17C 33/1075; F17C 33/128; F17C 33/20; F17C 33/201

USPC .......... 384/154, 155, 284, 293, 300; 29/898.1
See application file for complete search history.

(56) References Cited

U.S. PATENT DOCUMENTS 1,882,956 A * 10/1932 Sandler .................... B21B 1/227
                                                          101/381
2,757,055 A *  7/1956 Davis ...................... F16C 33/14
                                                          205/181
(Continued)

FOREIGN PATENT DOCUMENTS

DE     EP 0005560 A1 * 11/1979  ............ F16C 33/206
JP     2000-145784 A     5/2000
(Continued)

OTHER PUBLICATIONS

Japan Patent Office, Notification of Rejection Reason(s) for Japanese Patent Application No. 2012-137800, mailed Jul. 30, 2013, pp. 7.

*Primary Examiner* — Phillip A Johnson
(74) *Attorney, Agent, or Firm* — Chernoff, Vilhauer, McClung & Stenzel, LLP (57) ABSTRACT

To provide a half bearing which has excellent abrasion resistance and surely forms an oil film under boundary lubrication in which it is difficult to form any oil film. A half bearing 1 formed on a circular arc along a direction in which the member to be slid swings is provided with a porous layer 4 composed of Cu—Sn series alloy, which is formed on a surface of a metal substrate 3, and a sliding layer 2 in which the porous layer 4 is covered with resin material 5 including at least polytetrafluoroethylene and a carbon fiber. An uneven surface 6 having a height which maintains oil to form an oil film and maintains the oil so that the oil film is formed against abrasion when a member to be slid is sliding, is formed on a surface of the sliding layer 2 slidably bearing the member to be slid.

2 Claims, 7 Drawing Sheets

(51) Int. Cl.
*F16C 33/20* (2006.01)
*B22F 7/06* (2006.01)
*F16C 33/04* (2006.01)
*F04B 27/08* (2006.01)

(52) U.S. Cl.
CPC ............ F16C 33/103 (2013.01); F16C 33/201 (2013.01); F16C 33/206 (2013.01); *F05C 2253/12* (2013.01); *F05C 2253/20* (2013.01)

(56) References Cited

U.S. PATENT DOCUMENTS 3,058,791 A * 10/1962 Stallman ............. F16C 33/1065
  384/284
3,545,831 A * 12/1970 Denz ....................... F16C 33/24
  384/284
3,976,342 A * 8/1976 Leyendecker ........ F16C 33/102
  384/13

FOREIGN PATENT DOCUMENTS

| | | |
|---|---|---|
| JP | 2004533570 A | 11/2004 |
| JP | 2004533570 A5 | 7/2005 |
| JP | 2006-226299 A | 8/2006 |
| JP | 2007-225013 A | 9/2007 |
| JP | 2009-013487 A | 1/2009 |
| JP | 2010-159808 A | 7/2010 |
| JP | 2012-077764 A | 4/2012 |
| WO | 02/081910 A1 | 10/2002 |

* cited by examiner

Ra=6.018 μm
Rz=22.35 μm
Sm=0.4389mm
LONGITUDINAL MAGNIFICATION=1000  VERTICAL SCALE=10.00 μm/10mm
LATERAL MAGNIFICATION=50  HORIZONTAL SCALE=0.200mm/10mm

FIG. 5B

Ra=3.491 μm
Rz=12.74 μm
Sm=0.4304mm
LONGITUDINAL MAGNIFICATION=1000
LATERAL MAGNIFICATION=50
VERTICAL SCALE=10.00 μm/10mm
HORIZONTAL SCALE=0.200mm/10mm

FIG. 6A

Ra=2.262 μm
Rz=8.588 μm
Sm=0.3299mm
LONGITUDINAL MAGNIFICATION=1000
LATERAL MAGNIFICATION=50
VERTICAL SCALE=10.00 μm/10mm
HORIZONTAL SCALE=0.200mm/10mm

FIG. 6B

Ra=0.3373 μm
Rz=1.479 μm
Sm=0.1721mm
LONGITUDINAL MAGNIFICATION=1000
LATERAL MAGNIFICATION=50
VERTICAL SCALE=10.00 μm/10mm
HORIZONTAL SCALE=0.200mm/10mm

FIG. 7A

Ra=2.299 μm  LONGITUDINAL MAGNIFICATION=1000   VERTICAL SCALE=10.00 μm/10mm
Rz=8.798 μm  LATERAL MAGNIFICATION=50          HORIZONTAL SCALE=0.200mm/10mm
Sm=0.3114mm

FIG. 7B

Ra=0.5024 μm  LONGITUDINAL MAGNIFICATION=1000   VERTICAL SCALE=10.00 μm/10mm
Rz=2.308 μm   LATERAL MAGNIFICATION=50          HORIZONTAL SCALE=0.200mm/10mm
Sm=0.1212mm

HALF BEARING

TECHNICAL FIELD

The present invention relates to a half bearing which slidably bears a member to be slid.

BACKGROUND OF THE INVENTION

As the sliding member constituting a bearing, a sliding material has been known in which a porous layer composed of a copper (Cu) series alloy is formed on a metal substrate and resin materials mixing polytetrafluoroethylene (PTFE) and lead (Pb) coats this porous layer.

Such a sliding material in which a sliding layer is formed by the resin materials has excellent slidability but causes large abrasion loss, which is not suitable for usage under a heavy load condition. Since the usage of Pb is being limited, any sliding material free from Pb has been developed.

As the sliding member constituting a bearing, a sliding material in which Cu series alloy is stuck to a metal substrate has been also known. The sliding material in which Cu series alloy is stuck to the metal substrate such as copper plated steel plate and the like has less slidability than that of a sliding material in which a sliding layer is formed by any resin materials but is capable of preventing abrasion. Further, a technology to accelerate a formation of oil film by forming on a surface of the sliding layer any uneven shapes for oil reservoir has been proposed.

However, under a heavy load condition like an oil hydraulic pump called a piston pump, there has been a case when it cannot maintain such uneven shapes so that it cannot maintain desired slidability in usage for a long time.

When increasing a height of the uneven shape, it is possible to avoid any disappearance of the oil reservoir by abrasion but it is difficult to form the uneven shape having a desired height on the surface of the sliding layer formed by the Cu series alloy.

Accordingly, a technology to improve mechanical strength so that the sliding layer composed of the resin materials is not separated from porous layer by the sliding material in which the sliding layer is formed by any resin material and to form an oil reservoir having a desired shape have been known (For example, see Patent Document 1).

DOCUMENTS FOR PRIOR ART

Patent Documents

Patent Document 1: Japanese Patent Application Publication No. 2006-226299.

SUMMARY OF THE INVENTION

Problems to be Solved by the Invention

In even the conventional sliding material, however, the mechanical strength of which is improved so that the sliding layer composed of the resin materials is not separated from the porous layer, it is impossible to sufficiently prevent abrasion loss under a heavy load condition and to maintain any desired slidability in usage for a long time, which may generate any adhesion.

The invention has an object to present a half bearing that has an excellent abrasion resistance, and surely forms an oil film under boundary lubrication in which it is difficult to form any oil film.

Means for Solving the Problems

Inventors have found out that decreasing abrasion by an additive of resin materials constituting a sliding layer allows uneven shape on the sliding layer, which can form the oil film, to be maintained.

The invention relates to a half bearing containing a porous layer composed of Cu—Sn series alloy, which is formed on a surface of a metal substrate, and a sliding layer in which the porous layer is covered with resin material including at least polytetrafluoroethylene and a carbon fiber, wherein an uneven surface which maintains oil to form an oil film and has a height that maintains the oil so that the oil film is formed against abrasion when a member to be slid is sliding, is formed on a surface of the sliding layer slidably bearing the member to be slid, and the half bearing is formed on a circular arc along a direction in which the member to be slid swings.

It is desirable for the uneven surface of the sliding layer to have surface roughness of 3.0 through 10.0 μm in arithmetic mean roughness (Ra). Further, it is desirable to form the porous layer by sintering Cu—Sn series alloy having a particle size of 45 through 250 μm, the particles thereof being dispersed over a surface of the metal substrate, and to form the sliding layer by impregnating the resin material including at least the polytetrafluoroethylene and the carbon fiber into the porous layer by a roller having uneven surface for transferring the uneven surface on the sliding layer and sintering them.

Effects of the Invention

In the half bearing according to the invention, by forming the uneven surface which maintains the oil to form an oil film and has a height that maintains the oil so that the oil film is formed against abrasion when a member to be slid is sliding, on a surface of the sliding layer slidably bearing the member to be slid, it is possible to form the oil reservoir on the surface of the sliding layer and to maintain the uneven shape on the surface of the sliding layer even under use conditions such that heavy load is applied.

This enables the oil film to be surely formed even under the boundary lubrication in which the heavy load is applied and it is difficult to form any oil film to decrease the abrasion. This also enables any heat generation to decrease so that it has excellent cavitation erosion resistance in an art of oil hydraulic machinery and thus, has an effect of preventing the sliding member from generating any adhesion.

BEST MODE FOR CARRYING OUT THE INVENTION

Figure 1:
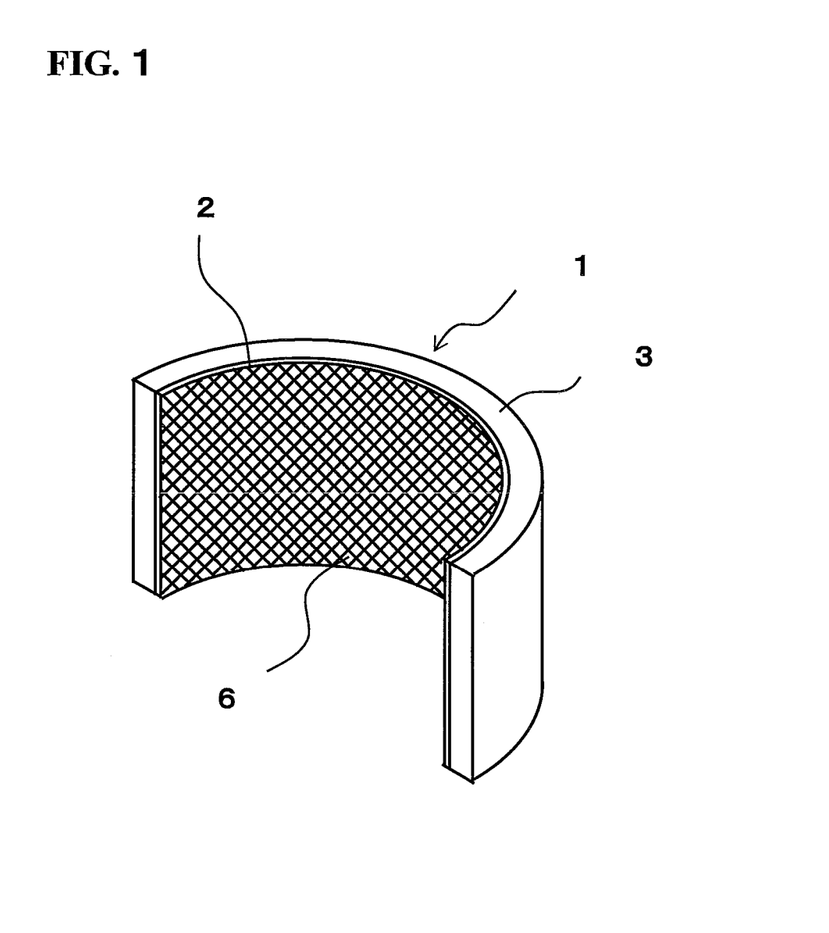
FIG. 1 is a perspective view of a half bearing according to an embodiment of an invention for showing an example thereof.
Figure 2:
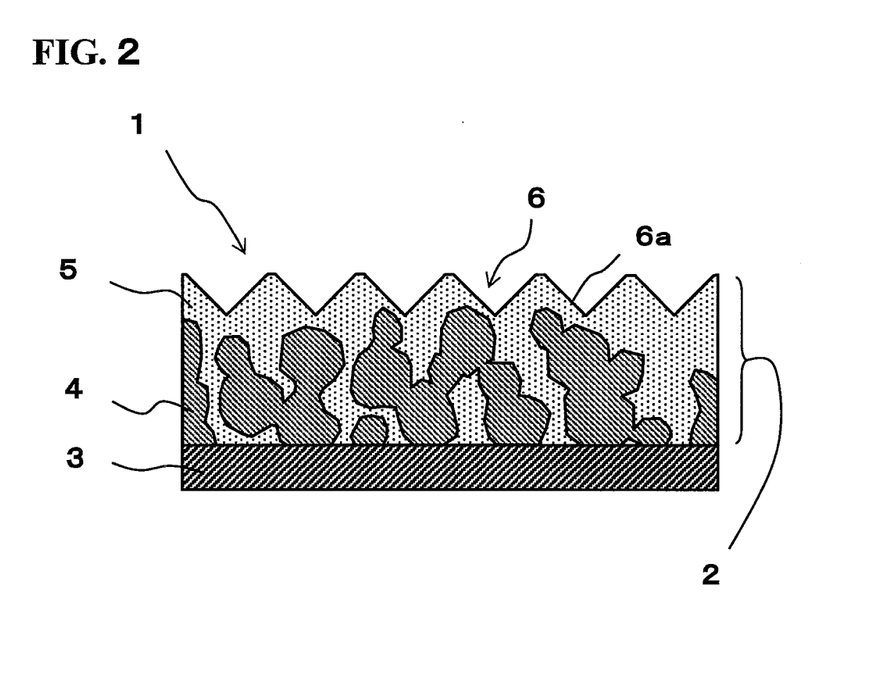
FIG. 2 is a sectional view of the sliding layer showing an example of the half bearing according to the embodiment thereof.
Figure 3:
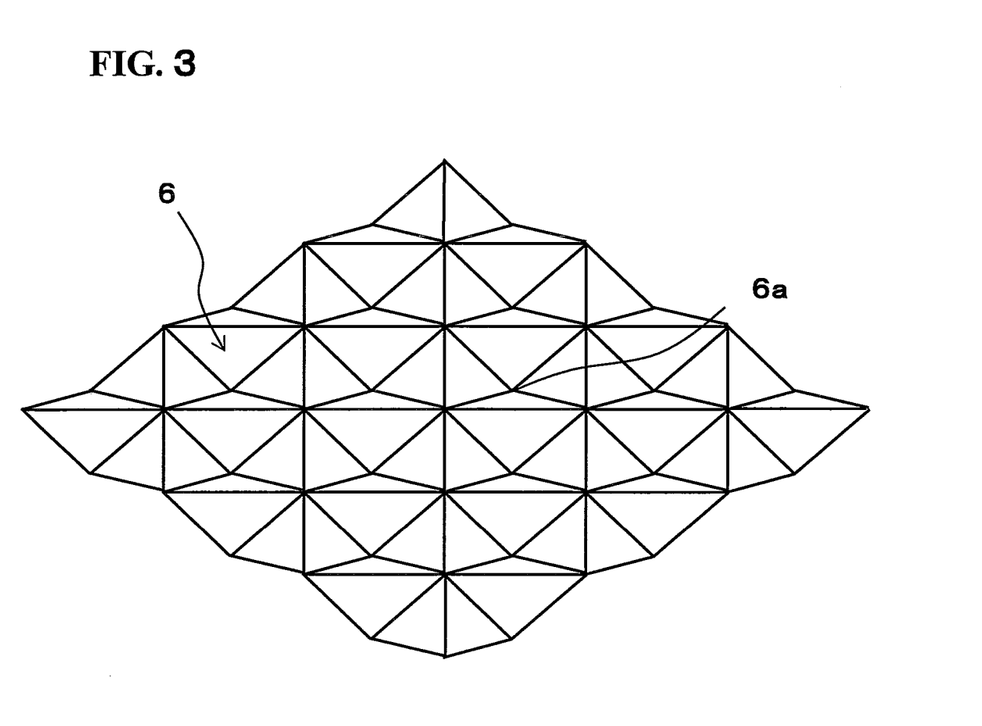
FIG. 3 is a perspective view of the sliding layer in the half bearing according to the embodiment thereof for showing an example of a surface shape of the sliding layer.

The following will describe embodiments of a half bearing according to the present invention with reference to drawings. FIG. 1 is a perspective view of the half bearing according to the embodiment of the invention for showing an example thereof. FIG. 2 is a sectional view of the sliding layer showing an example of the half bearing according to the embodiment thereof. FIG. 3 is a perspective view of the sliding layer in the half bearing according to the embodiment thereof for showing an example of a surface shape of the sliding layer.

The half bearing 1 according to the embodiment constitutes a bearing having a cylindrical shape as shown in FIG. 1 and an internal circumferential surface thereof is a sliding layer 2 with the member to be slid. The half bearing 1 is configured, as shown in FIG. 2, so that a porous layer 4 composed of alloy material is formed on a surface of a metal substrate 3, which is one surface thereof, and resin material 5 coats the porous layer 4 to form the sliding layer 2.

The half bearing 1 is provided with an uneven surface 6 on a surface of the sliding layer 2 which slidably bears the member to be slid. The uneven surface 6 is configured to have a shape that is suitable for forming an oil film and maintaining oil film and have the shape that prevents a variation of the shape by abrasion based on uneven loading by a swing of the member to be slid.

Namely, the uneven surface 6 is configured to have a recess portion 6a having a desired shape that becomes an oil reservoir in order to allow the oil film to be formed on a surface of the sliding layer 2. In this embodiment, as shown in FIG. 3, the uneven surface 6a is formed to have the reversed-quadrangular-pyramid shaped recess portions 6a, in which line-like vertexes that are continuous are arranged in gridlike fashion.

Further, on the uneven surface 6, in order to maintain the shape of the recess portion 6a which is able to form the oil film even by the abrasion based on the swing of the member to be slid, a height of the recess portion 6a from a bottom thereof to a vertex thereof is provided on the basis of the abrasion loss in the sliding layer 2 and a surface roughness so that the recess portion 6a can maintain a desired height is also provided.

In the half bearing 1, the porous layer 4 is formed by Cu—Sn series alloy. The porous layer 4 is formed by sintering Cu—Sn series alloy having a particle size of 45 through 250 μm, the particles thereof being dispersed over a surface of the metal substrate 3 so as to have a desired thickness.

In the half bearing 1, the sliding layer 2 is formed by the resin material 5 including at least polytetrafluoroethylene (PTFE) and a carbon fiber. The sliding layer 2 is formed by impregnating the resin material 5 into the porous layer 4, which has been sintered on the surface of the metal substrate 3, by a roller, not shown, having uneven shape for transferring the uneven surface 6 on the surface of the sliding layer 2 and sintering them.

In the half bearing 1, the height of the recess portion 6a from a bottom thereof to a vertex thereof is provided so that the uneven surface 6 of the sliding layer 2 has surface roughness of 3.0 through 10.0 μm, preferably 6.0 μm or more and 10.0 μm or less, in arithmetic mean roughness (Ra).

As described above, since the formation of the uneven surface 6 on the sliding layer 2 is done by transfer to the resin material 5 before the hardening thereof using a mold, it is easy to form the uneven shape having any desired height.

In the half bearing 1 according to the embodiment, by configuring the surface shape of the sliding layer 2 to be the uneven surface 6 having a shape that is suitable for forming the oil film and maintaining the oil film and having the shape that prevents a variation thereof by abrasion based on the uneven loading by the swing of the member to be slid, it is possible to have an excellent abrasion resistance using polytetrafluoroethylene having low friction coefficient.

Figure 4:
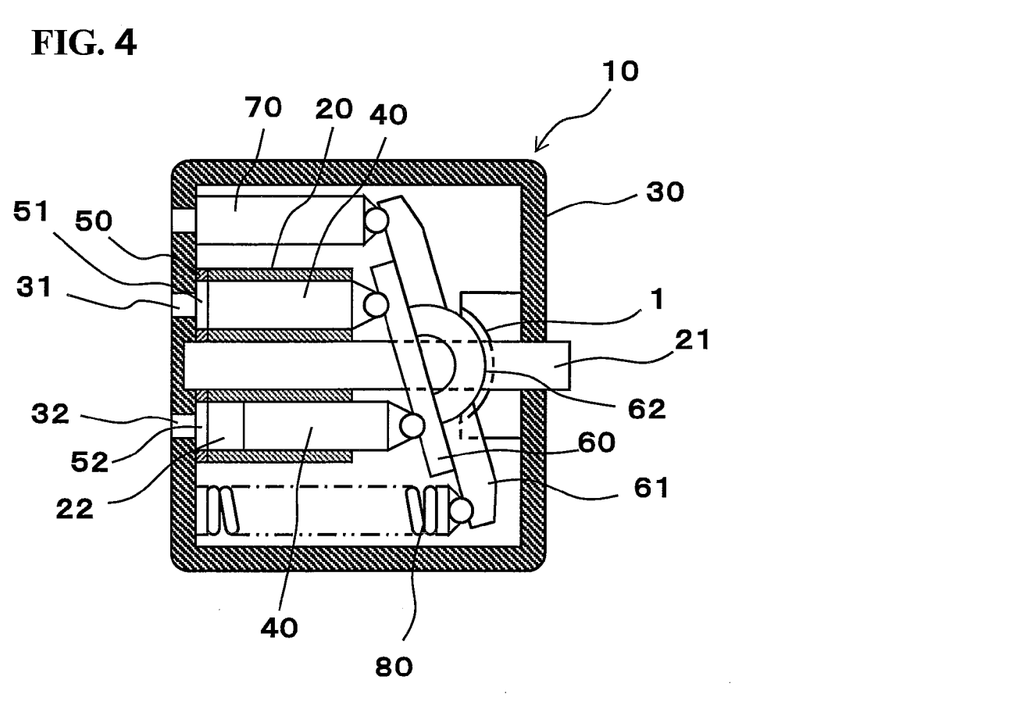
FIG. 4 is a diagram for showing a configuration example of a piston pump to which the half bearing according to the embodiment thereof is applied.

Accordingly, in particular, the half bearing 1 according to the embodiment is preferably applicable to hydraulic equipment such as a hydraulic pump and the like. FIG. 4 is a diagram for showing a configuration example of the piston pump to which the half bearing according to the embodiment thereof is applied. FIG. 4 is a typical side sectional view thereof.

In the piston pump 10, a cylinder block 20 is attached to a case 30 with the input shaft 21 supporting it and driving force transmitted to the input shaft 21 forces the cylinder block 20 to rotate. In the cylinder block 20, plural cylinders 22 are formed along the rotation direction and a piston 40 is installed in each of the cylinders 22 so as to be freely drawn and inserted.

The piston pump 10 is provided with a plain bearing 50 which rotatably supports the cylinder block 20. The plain bearing 50 is provided with an inlet port 51 and an outlet port 52 which are opened along the rotating direction of the cylinder block 20 and is installed between the cylinder block 20 and the case 30 with the inlet port 51 and an inlet 31 provided in the case 30 being communicated to each other and the outlet port 52 and an outlet 32 provided in the case 30 being communicated to each other. The plain bearing 50 is configured so that when the cylinder block 20 rotates with it being pushed to an axis direction, the cylinder block 20 and the plain bearing 50 are relatively slid.

The piston pump 10 is provided with a swash plate 60 for drawing and inserting the piston 40 in relation to each of the cylinders 22 of the cylinder block 20 together with the rotation of the cylinder block 20, a yoke 61 for changing an angle of the swash plate 60, and an operation piston 70 and a return spring 80, which operate the swash plate 60 and the yoke 61.

In the piston pump 10, together with the rotation of the cylinder block 20, the cylinder 22 in which the piston is projected from the cylinder block 20 absorbs the oil but the cylinder 22 into which the piston is inserted from the cylinder block 20 discharges the oil. The piston pump 10 is configured so that, by changing an angle of the swash plate 60 and the yoke 61, a stroke of the piston 40 alters and a discharged amount of the oil is adjustable.

The piston pump 10 is provided with the half bearing 1, which is attached to the case 30, for swingably supporting the swash plate 60 and the yoke 61. The half bearing 1 has the configuration described in relation to the above FIGS. 1 through 3. By swing an axis portion 62 of the yoke 61 as the member to be slid with it being pushed to a circumferential direction, the axis portion 62 and the half bearing 1 are relatively slid.

When the cylinder block 20 is configured to rotate in one direction, the piston pump 10 is configured so that the oil-absorbing side and the oil-discharging side are fixed but when the cylinder block 20 is configured to rotate in both forward and reverse directions, the piston pump 10 is configured so that the oil-absorbing side and the oil-discharging side are changeable. On the plain gearing 50, the cylinder block 20 slides in one direction or both forward and reverse directions along the circumferential direction while heavy load is applied thereto by pushing the cylinder block 20 to the axis direction. Accordingly, the cylinder block 20 and the plain bearing 50 slide in a circular direction with heavy load being applied to them.

The piston pump 10 is also configured so that the swash plate 60 and the yoke 61 are swung in both forward and reverse directions to change a discharged amount of the oil. The half bearing 1 is configured so that the axis portion 62 of the yoke 61 slides on both forward and reverse directions along the circumferential direction while heavy load is applied thereto by pushing the axis portion 62 of the yoke 61 to the circumferential direction. Accordingly, the axis portion 62 and the half bearing 1 slide to a linear direction with heavy load being applied to them.

EMBODIMENTS

A test was carried out using the piston pump 10 shown in FIG. 4 in order to inspect any influence in which a difference in configuration of the sliding layer and a shape of the surface thereof in the half bearing was exerted to durability such as the adhesion and the abrasion. As the half bearing to be tested, they prepared the half bearing 1 as the embodiment in which the porous layer 4 composed of Cu—Sn series alloy was formed on the surface of the metal substrate 3, the resin material 5 including at least polytetrafluoroethylene and a carbon fiber coated the porous layer 4 to form the sliding layer 2, and the uneven surface 6 was formed on the surface of the sliding layer 2.

Further, they prepared the half bearing as the comparison example 1 in which the porous layer composed of Cu—Sn series alloy was formed on the surface of the metal substrate, and the resin material including polytetrafluoroethylene and lead (Pb) coated the porous layer to form a sliding layer 2. In the half bearing of the comparison example 1, no uneven surface was formed on the surface of the sliding layer.

Additionally, they prepared the half bearing as the comparison example 2 in which the sliding layer was formed by bonding plate-like Cu—Sn series alloy to the surface of the metal substrate, and the sliding surface having a predetermined surface roughness and a predetermined surface hardness was formed by performing shot blasting process on the formed sliding layer.

Figure 5A:
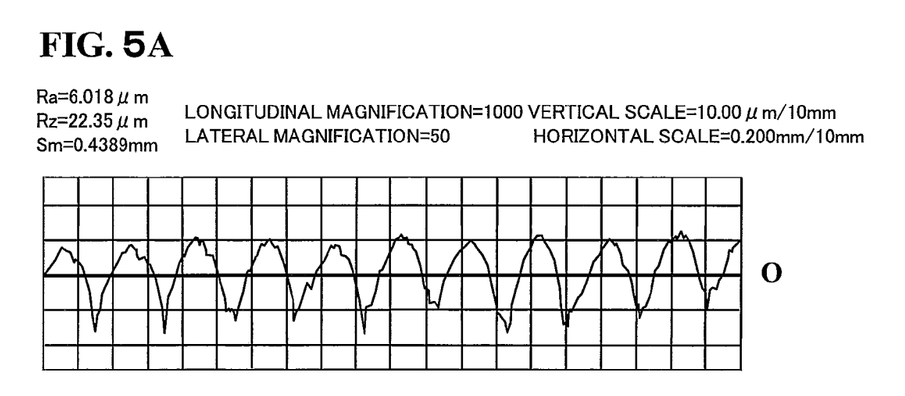
FIG. 5A is a graph showing a surface roughness shape of the sliding layer before the test of the half bearing in the embodiment.
Figure 5B:
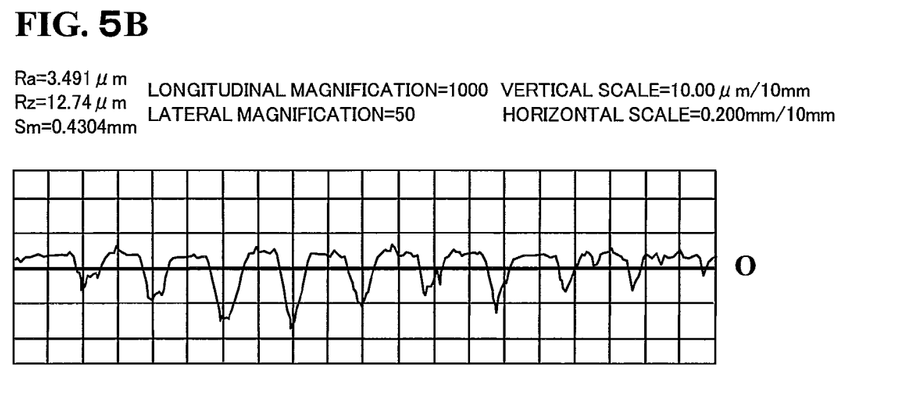
FIG. 5B is a graph showing a surface roughness shape of the sliding layer after the test of the half bearing in the embodiment.

Test condition was as follows:
Cut-off durability test
Discharge Pressure: 0 through 28 MPa;
Cycle Number: 250 thousand cycles (ON 1 sec; OFF 1 sec);
Temperature of Oil: 60° C.; and
Number of Shaft Revolution N: 1800 rpm FIGS. 5A and 5B are graphs showing surface roughness shapes of the sliding layer before and after the test of the half bearing in the embodiment. FIG. 5A shows the surface roughness shape thereof before the test and FIG. 5B shows the surface roughness shape thereof after the test (250 thousand cycles).

Figure 6A:
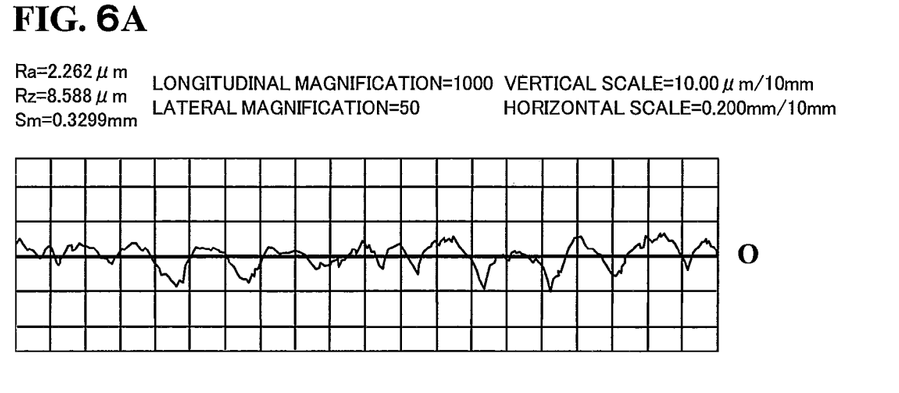
FIG. 6A is a graph showing a surface roughness shape of the sliding layer before the test of the half bearing in the comparison example 1.
Figure 6B:
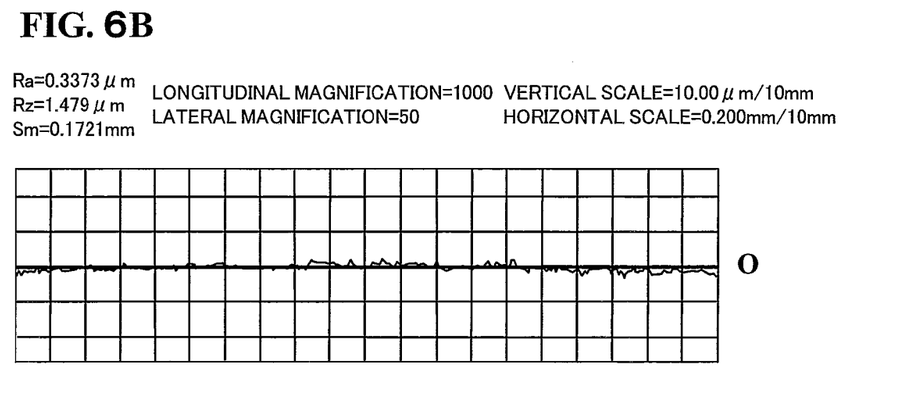
FIG. 6B is a graph showing a surface roughness shape of the sliding layer after the test of the half bearing in the comparison example 1.

Further, FIGS. 6A and 6B are graphs showing surface roughness shapes of the sliding layer before and after the test of the half bearing in the comparison example 1. FIG. 6A shows the surface roughness shape thereof before the test and FIG. 6B shows the surface roughness shape thereof after the test (250 thousand cycles).

Figure 7A:
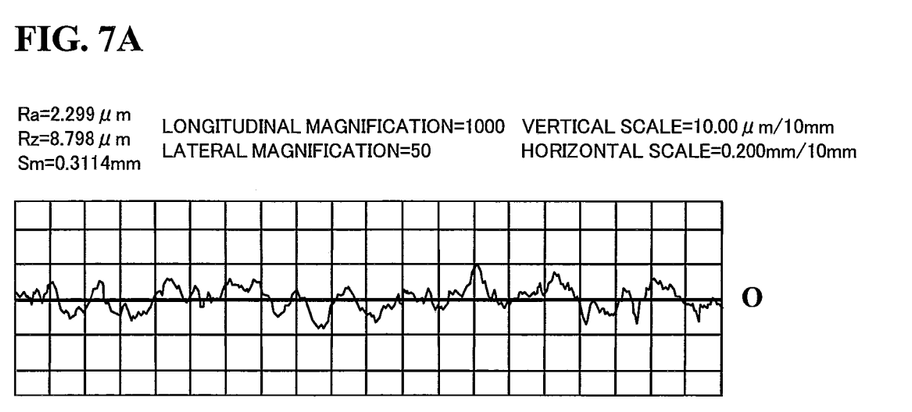
FIG. 7A is a graph showing a surface roughness shape of the sliding layer before the test of the half bearing in the comparison example 2.
Figure 7B:
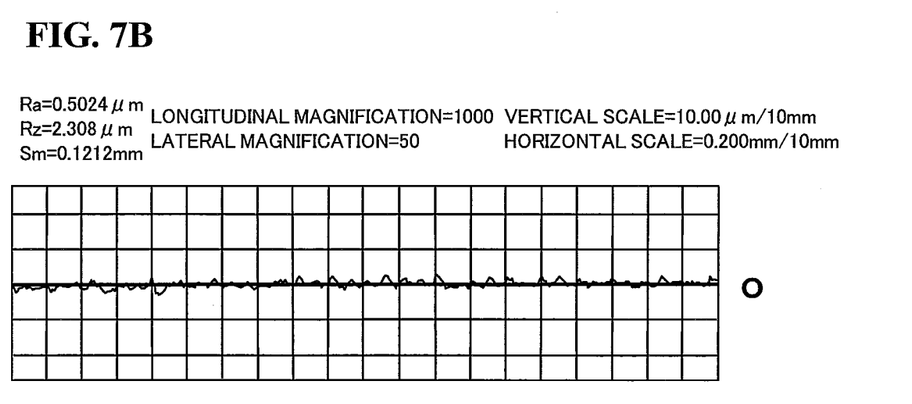
FIG. 7B is a graph showing a surface roughness shape of the sliding layer after the test of the half bearing in the comparison example 2.

Additionally, FIGS. 7A and 7B are graphs showing surface roughness shapes of the sliding layer before and after the test of the half bearing in the comparison example 2. FIG. 7A shows the surface roughness shape thereof before the test and FIG. 7B shows the surface roughness shape thereof after the test (250 thousand cycles). Here, FIGS. 5A, 5B, 6A, 6B, 7A and 7B are based on JIS B 0601 (1994).

Figure 8:
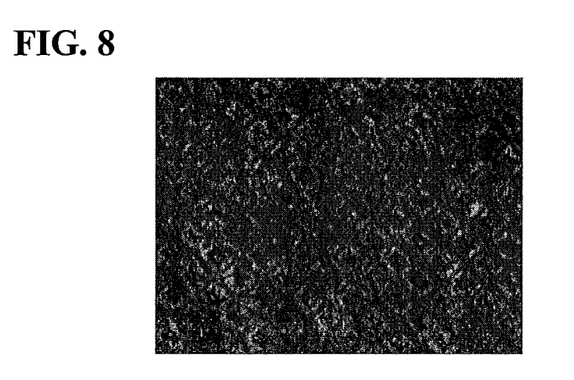
FIG. 8 is a microphotograph of a surface of the sliding layer in the embodiment.
Figure 9:
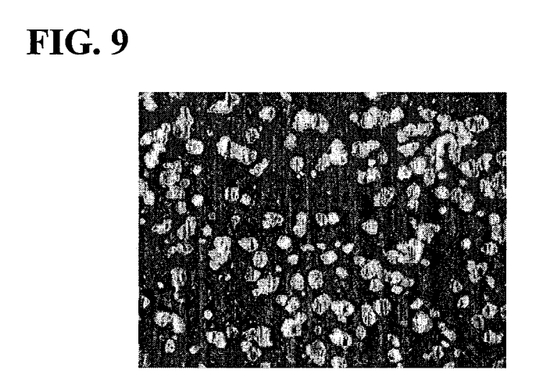
FIG. 9 is a microphotograph of a surface of the sliding layer in the comparison example 1.
Figure 10:
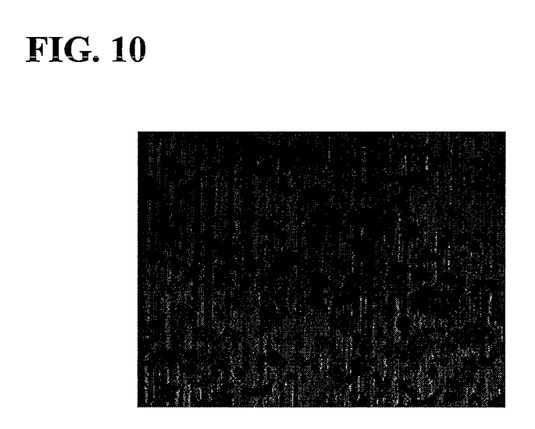
FIG. 10 is a microphotograph of a surface of the sliding layer in the comparison example 2.
Figure 11:
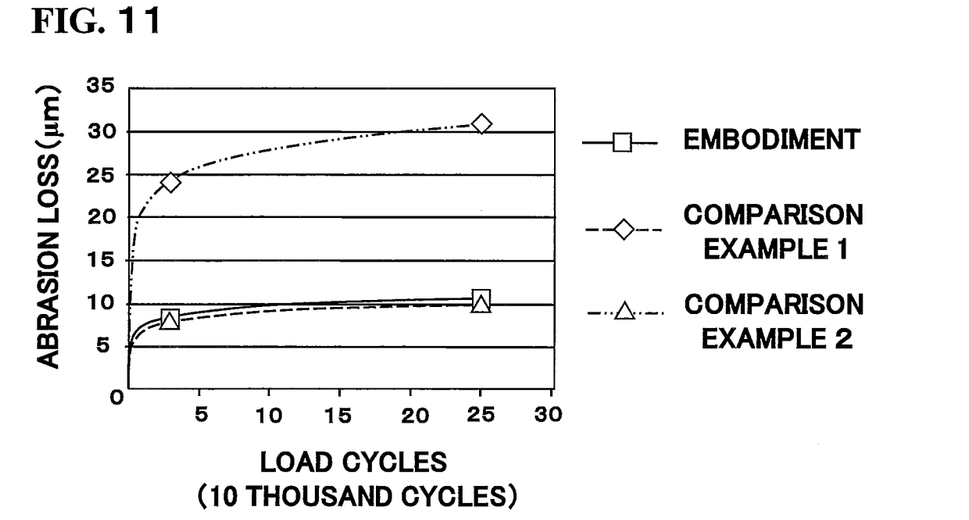
FIG. 11 is a graph showing a variation in abrasion loss on each of the sliding layers of the embodiment and the comparison examples.

FIG. 8 is a microphotograph of a surface of the sliding layer after the test (250 thousand cycles) in the half bearing according to the embodiment. FIG. 9 is a microphotograph of a surface of the sliding layer after the test (250 thousand cycles) in the half bearing according to the comparison example 1. FIG. 10 is a microphotograph of a surface of the sliding layer after the test (250 thousand cycles) in the half bearing according to the comparison example 2. Further, FIG. 11 is a graph showing a variation in the abrasion loss on each of the sliding layers of the embodiment and the comparison examples. The abrasion loss on each of the sliding layers of the embodiment and the comparison examples was obtained by measuring thickness of each of the half bearings before the test and thickness thereof for every cycle as the thickness after the test using a micrometer and calculating difference therebetween.

Since the half bearing 1 according to the embodiment had the uneven surface 6 having a shape shown in FIG. 2 or the like on the surface of the sliding layer 2, it indicated as shown in FIG. 5A that the arithmetic mean roughness (Ra) before the test was 6.018 µm, 10-point average roughness (Rz) before the test was 22.35 µm and average spacing in roughness (Sm) before the test was 0.4389 mm.

As opposed to such a shape before the test, it indicated as shown in FIG. 5B that the arithmetic mean roughness (Ra) after the test under the above-mentioned condition was 3.491 µm, the 10-point average roughness (Rz) after the test was 12.74 µm and the average spacing in roughness (Sm) after the test was 0.4304 mm.

In the half bearing 1 according to the embodiment, as shown in the microphotograph of FIG. 8, a slight abrasion was shown on the vertexes of the uneven surface 6 on the surface of the sliding layer 2 even after 250 thousand cycles but no adhesion was shown.

They have found out that the half bearing 1 according to the embodiment improves its heat resistant and its pressure resistant because the carbon fiber is mixed to the sliding layer 2 and prevents the abrasion of the sliding layer 2 as shown in FIG. 11 even under use conditions such that heavy load is applied for a long time. Further, since the half bearing 1 according to the embodiment has the uneven surface 6, which is formed on the surface of the sliding layer 2, having the height higher than that of each of the comparison examples shown in FIGS. 6A and 7A at initial stage as shown in FIG. 5A, the oil film is more surely formed so that they have found out that the shape of the surface of the sliding layer 2 in addition to the composition of the sliding layer 2 prevents the abrasion of the sliding layer 2. They also have found out that the uneven shape which becomes any oil reservoir to form the oil film remains, as shown in FIG. 5B, even under use conditions such that heavy load is applied for a long time. They further have found out that the half bearing 1 according to the embodiment prevents any abrasion of the sliding layer 2 because the sliding layer 2 is composed of polytetrafluoroethylene which has lower friction coefficient than that of Cu series alloy.

The half bearing according to the comparison example 1 indicated as shown in FIG. 6A that the arithmetic mean roughness (Ra) before the test was 2.262 μm, the 10-point average roughness (Rz) before the test was 8.588 μm and the average spacing in roughness (Sm) before the test was 0.3299 mm.

As opposed to such a shape before the test, it indicated as shown in FIG. 6B that the arithmetic mean roughness (Ra) after the test under the above-mentioned condition was 0.3373 μm, the 10-point average roughness (Rz) after the test was 1.479 μm and the average spacing in roughness (Sm) after the test was 0.1721 mm.

In the half bearing according to the comparison example 1, as shown in the microphotograph of FIG. 9, no adhesion was shown but the porous layer was exposed after 250 thousand cycles. They have found out that the half bearing according to the comparison example 1 has good slidability because lead (PB) is contained therein but the abrasion loss is large as shown in FIG. 11 so that there is a high probability of generating adhesion under use conditions in which that heavy load is applied for a long time.

The half bearing according to the comparison example 2 indicated as shown in FIG. 7A that the arithmetic mean roughness (Ra) before the test was 2.299 μm, the 10-point average roughness (Rz) before the test was 8.798 μm and the average spacing in roughness (Sm) before the test was 0.3114 mm.

As opposed to such a shape before the test, it indicated as shown in FIG. 7B that the arithmetic mean roughness (Ra) after the test under the above-mentioned condition was 0.5024 μm, the 10-point average roughness (Rz) after the test was 2.308 μm and the average spacing in roughness (Sm) after the test was 0.1212 mm.

In the half bearing according to the comparison example 2, as shown in the microphotograph of FIG. 10, no adhesion was shown after 250 thousand cycles. The uneven by the blasting process remained but the height of the uneven decreased as shown in FIG. 7B. Since the sliding layer composed of Cu—Sn series alloy is formed in the half bearing according to the comparison example 2, the abrasion is prevented as shown in FIG. 11 but the height of the uneven surface, shown in FIG. 7A, which is formable by the shot blasting process is lower than that of the sliding layer of the embodiment shown in FIG. 5A. Thus, they have found out that the embodiment and the comparison example 2 have the similar abrasion loss as shown in FIG. 11 but under the use conditions such that heavy load is applied for a long time, any uneven shapes, which becomes the oil reservoir that forms the oil film, remain, as shown in FIG. 5B, in the embodiment while any uneven shapes, which becomes the oil reservoir that forms the oil film, disappear, as shown in FIG. 7B, so that there is a high probability of generating the adhesion in the comparison example 2.

As results of the above, they have found out that the porous layer 4 in the half bearing 1 is preferably composed of Cu—Sn series alloy having a particle size of 45 through 250 μm, in order to maintain the sliding layer 2 under the use conditions such that heavy load is applied for a long time.

They have also found out that the sliding layer 2 in the half bearing 1 is preferably composed of resin material 5 including the polytetrafluoroethylene which has low friction factor and a carbon fiber which has good heat resistant and good pressure resistant.

Further, they have found out that the uneven surface 6 of the sliding layer 2 in the half bearing 1 preferably has surface roughness of 3.0 through 10.0 μm, more preferably, 6.0 through 10.0 μm, in the arithmetic mean roughness (Ra).

INDUSTRIAL APPLICABILITY

The present invention is applied to a sliding member used under the boundary lubrication in which the heavy load is applied and it is difficult to form any oil film.

DESCRIPTION OF CODES

1 . . . Half Bearing; 2 . . . Sliding Layer; 3 . . . Metal Substrate; 4 . . . Porous Layer; 5 . . . Resin Material; 6 . . . Uneven Surface; 6a . . . Recess Potion

What is claimed is:
1. A halved bearing comprising:
a porous layer composed of Cu—Sn series alloy, formed on a surface of a metal substrate; and
a sliding layer in which the porous layer is covered with resin material including at least polytetrafluoroethylene and a carbon fiber,
wherein an uneven surface which maintains oil to form an oil film and has a shape that prevents the shape from changing against abrasion when a member to be slid is sliding and a height that maintains the oil so that the oil film is formed, is formed on a surface of the sliding layer slidably bearing the member to be slid, and
wherein the halved bearing is formed on a circular arc along a direction in which the member to be slid swings, and wherein the uneven surface of the sliding layer has surface roughness of 3.0 through 10.0 μm in arithmetic average roughness (Ra) and has a plurality of reversed-quadrangular-pyramid shaped recess portions defining an oil sump, in which a plurality of linear vertexes that are continuous are arranged in the form of a grid.
2. The half bearing according to claim 1 wherein the porous layer is formed by sintering the Cu—Sn series alloy having a particle size of 45 through 250 μm, the particles thereof being dispersed over a surface of the metal substrate, and
the sliding layer is formed by impregnating the resin material including at least the polytetrafluoroethylene and the carbon fiber into the porous layer by a roller having an uneven surface for transferring the uneven surface on the sliding layer and sintering them.

* * * * *